US009916720B2

(12) United States Patent
Robbins et al.

(10) Patent No.: US 9,916,720 B2
(45) Date of Patent: Mar. 13, 2018

(54) INTELLIGENT WAGERING GAME CONTENT DISTRIBUTION

(71) Applicant: WMS Gaming, Inc., Waukegan, IL (US)

(72) Inventors: Richard B. Robbins, Glenview, IL (US); Damon E. Gura, Chicago, IL (US); Michael J. Irby, II, Chicago, IL (US); Scott A. Massing, Lincolnwood, IL (US); Jamie W. Vann, Chicago, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 548 days.

(21) Appl. No.: 14/451,138

(22) Filed: Aug. 4, 2014

(65) Prior Publication Data

US 2015/0038236 A1 Feb. 5, 2015

Related U.S. Application Data

(60) Provisional application No. 61/861,546, filed on Aug. 2, 2013.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ...... *G07F 17/3218* (2013.01); *G07F 17/3223* (2013.01); *G07F 17/3227* (2013.01); *G07F 17/3239* (2013.01)

(58) Field of Classification Search

USPC ...................... 463/20, 22, 25, 30, 39, 40, 42

See application file for complete search history.

(56) References Cited

U.S. PATENT DOCUMENTS

| | | | |
|---|---|---|---|
| 6,068,552 | A | 5/2000 | Walker et al. |
| 6,110,041 | A | 8/2000 | Walker et al. |
| 6,254,483 | B1 | 7/2001 | Acres |
| 6,293,866 | B1 | 9/2001 | Walker et al. |
| 6,342,010 | B1 | 1/2002 | Slifer |
| 6,350,199 | B1 | 2/2002 | Williams et al. |
| 6,503,145 | B1 | 1/2003 | Webb |

(Continued)

FOREIGN PATENT DOCUMENTS

| | | |
|---|---|---|
| EP | 2005400 | 4/2012 |
| WO | 2007009255 | 1/2007 |
| WO | 2009097538 | 8/2009 |

*Primary Examiner* — Adetokunbo O Torimiro

(74) *Attorney, Agent, or Firm* — DeLizio Law, PLLC

(57) ABSTRACT

A method for selecting content for delivery to devices is described herein. In some embodiments, the method can include registering a plurality of devices of one or more device types. The method can further include receiving usage information indicating usage of the devices and affinity information indicating user affinities associated with the devices. The method can further include detecting that a device of the plurality of devices is in-use. The method can further include determining, based on the usage information and the affinity information, game content for the device currently used. The method can further include transmitting, to the device, the game content.

23 Claims, 6 Drawing Sheets

(56) References Cited

U.S. PATENT DOCUMENTS

| | | | |
|---|---|---|---|
| 6,520,856 | B1 | 2/2003 | Walker et al. |
| 6,628,939 | B2 | 9/2003 | Paulsen |
| 6,749,510 | B2 | 6/2004 | Giobbi |
| 6,769,986 | B2 | 8/2004 | Vancura |
| 6,805,633 | B2 | 10/2004 | Hein, Jr. et al. |
| 6,843,725 | B2 | 1/2005 | Nelson |
| 7,003,515 | B1 | 2/2006 | Glaser et al. |
| 7,033,276 | B2 | 4/2006 | Walker et al. |
| 7,040,987 | B2 | 5/2006 | Walker et al. |
| 7,139,052 | B2 | 11/2006 | Maeda |
| 7,510,474 | B2 | 3/2009 | Carter, Sr. |
| 7,559,838 | B2 | 7/2009 | Walker et al. |
| 7,722,453 | B2 | 5/2010 | Lark et al. |
| 7,753,789 | B2 | 7/2010 | Walker et al. |
| 7,798,899 | B2 | 9/2010 | Acres |
| 7,883,413 | B2 | 2/2011 | Paulsen |
| 7,918,728 | B2 | 4/2011 | Nguyen et al. |
| 7,918,738 | B2 | 4/2011 | Paulsen |
| 8,078,694 | B2 | 12/2011 | Barton et al. |
| 8,087,988 | B2 | 1/2012 | Nguyen et al. |
| 8,147,323 | B2 | 4/2012 | Joshi et al. |
| 8,172,682 | B2 | 5/2012 | Acres et al. |
| 8,187,073 | B2 | 5/2012 | Beaulieu et al. |
| 8,221,245 | B2 | 7/2012 | Walker et al. |
| 8,282,475 | B2 | 10/2012 | Nguyen et al. |
| 8,370,737 | B2 | 2/2013 | Zahavi et al. |
| 8,425,332 | B2 | 4/2013 | Walker et al. |
| 8,435,105 | B2 | 5/2013 | Paulsen |
| 8,474,820 | B2 | 6/2013 | Walker et al. |
| 8,613,648 | B2 | 12/2013 | Aoki et al. |
| 8,702,490 | B2 | 4/2014 | Acres |
| 8,777,737 | B2 † | 7/2014 | LeMay |
| 2002/0026507 | A1 | 2/2002 | Sears et al. |
| 2002/0116615 | A1 * | 8/2002 | Nguyen .................. H04L 67/38 713/168 |
| 2002/0142846 | A1 | 10/2002 | Paulsen |
| 2004/0048657 | A1 | 3/2004 | Gauselmann |
| 2004/0142747 | A1 | 7/2004 | Pryzby |
| 2004/0166940 | A1 | 8/2004 | Rothschild |
| 2004/0180712 | A1 | 9/2004 | Forman et al. |
| 2004/0229698 | A1 * | 11/2004 | Lind ....................... A63F 13/12 463/42 |
| 2005/0043092 | A1 | 2/2005 | Gauselmann |
| 2005/0170890 | A1 | 8/2005 | Rowe et al. |
| 2005/0277469 | A1 | 12/2005 | Pryzby et al. |
| 2006/0178189 | A1 | 8/2006 | Walker et al. |
| 2006/0211494 | A1 | 9/2006 | Helfer |
| 2006/0252522 | A1 | 11/2006 | Walker et al. |
| 2006/0252523 | A1 | 11/2006 | Walker et al. |
| 2008/0045317 | A1 * | 2/2008 | Seelig ..................... G07F 17/32 463/20 |
| 2010/0017502 | A1 | 1/2010 | Cheng et al. |
| 2010/0298040 | A1 | 11/2010 | Joshi et al. |
| 2011/0118002 | A1 | 5/2011 | Aoki |
| 2011/0223995 | A1 * | 9/2011 | Geisner ................... G06F 3/011 463/36 |
| 2012/0136274 | A1 * | 5/2012 | Burdea .............. A61B 5/04842 600/545 |
| 2014/0100030 | A1 * | 4/2014 | Burke ................. G07F 17/3204 463/31 |
| 2014/0337454 | A1 † | 11/2014 | Yamamoto |
| 2015/0326689 | A1 * | 11/2015 | Leppanen ............ G06Q 10/101 370/328 |

* cited by examiner
† cited by third party

INTELLIGENT WAGERING GAME CONTENT DISTRIBUTION

RELATED APPLICATIONS

This application claims the priority benefit of U.S. Provisional Application Ser. No. 61/861,546 filed 2 Aug. 2013.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2014, WMS Gaming, Inc.

FIELD

Embodiments of the inventive subject matter relate generally to wagering game systems, and more particularly to wagering game systems capable of intelligent game content selection.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Introduction

This section provides an introduction to some embodiments of the invention.

Figure 1:
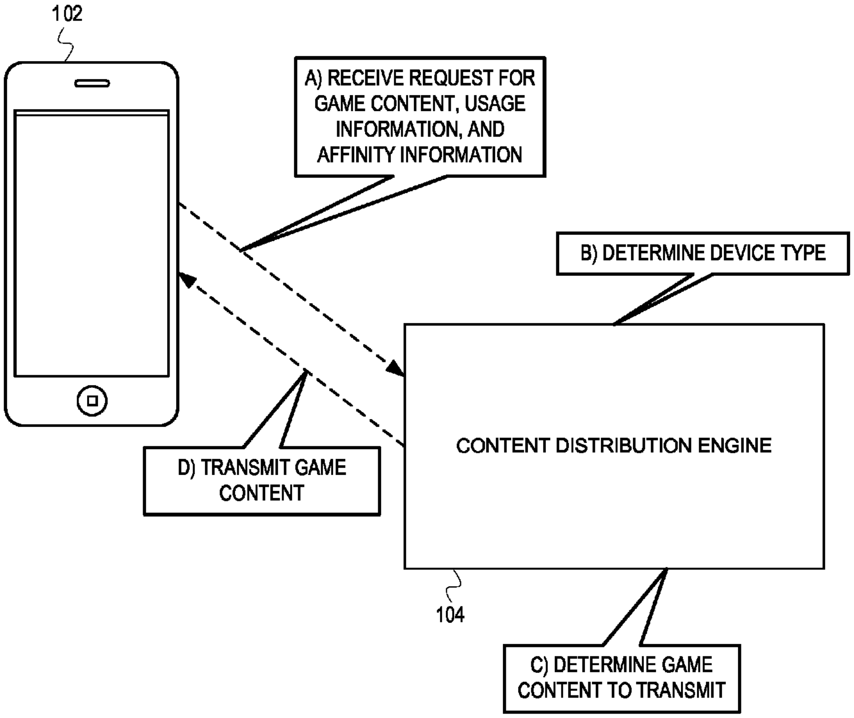
FIG. 1 depicts example operations and communications that facilitate game content selection, according to some embodiments of the inventive subject matter.

With such a vast variety of game content available, players may have difficulty selecting games suited to their personal preferences, current surroundings, current tasks, etc. For example, a player may wish to play a game on his/her mobile device while commuting via public transit. The player may prefer poker wagering games and music-themed social games. For the player to satisfy his/her desire, the player may have to search through a seemingly endless game catalogue to find a game meeting his/her preferences, such as a game that is non-disruptive while commuting via public transit, and requires an appropriate concentration level for commuting via public transit. Some embodiments of the inventive subject matter aid the player by analyzing player preferences, device usage, usage environment (location, situation, etc.), device type, etc. to provide the player with a game suited to his/her preferences, environment, attention capability in the environment, etc. FIG. 1 shows more detail about how some embodiments select game content for players.

FIG. 1 depicts example operations and communications that facilitate game content selection, according to some embodiments of the inventive subject matter. FIG. 1 depicts example operations at stages A-D. The stages are examples and are not necessarily discrete occurrences over time (e.g., operations of different stages may overlap).

As depicted in FIG. 1, at stage A, a content distribution engine 104 receives a request for game content, usage information, and affinity information from a mobile device 102. The usage information can include usage of the mobile device 102. The usage information can include the device type making the request, applications used currently and/or previously used on the mobile device 102, browsing history of an internet browser on the mobile device 102, information indicating the geographic location of the mobile device 102, information indicating the environment in which the mobile device 102 currently resides, a connection speed or strength of the mobile device 102, etc. The affinity information can include indications of a player's preferences for games previously played on the device (e.g., whether the player liked or disliked a game previously played) and indications of a player's preferences for games, media, and other content generally. In some embodiments, the player may provide affinity information explicitly by giving thumbs-up/thumbs-down or other rating information about games and other content. Affinity information may be implied through frequency of play or other use-based inferences.

At stage B, the content distribution engine 104 determines the type of device that made the game content request and transmitted the usage information and affinity information. As depicted in FIG. 1 the mobile device 102 is a cellular telephone. The device can be of any type (e.g., a desktop computer, laptop computer, tablet computer, personal digital assistant (PDA), gaming console, etc.).

At stage C, the content distribution engine 104 determines game content to transmit to the mobile device 102. In some embodiments, this determination is made by analyzing the usage information, affinity information, and device type. For example, the usage information can indicate that the player is currently at home, has a high speed internet connection, and is in a quiet environment. The affinity information (based on previous games played or information provided by the player) can indicate that the player prefers casino-style card games that are fast-paced. As one example, the content distribution engine 104 can use this information to determine that the player is able to devote sufficient attention to a game, the player would like fast-paced blackjack game, and that the game need not be noisy. Alternatively, the usage information can indicate that the player is running errands, and thus is not able to devote significant attention to the game. Using this information, the content distribution engine 104 can determine that a game requiring lesser attention is appropriate. Additionally, the content distribution engine 104 can select game content based on the type of device from which the request is received. For example, if the content distribution engine 104 receives the request from a desktop computer, the content distribution engine 104 can provide a game that is RAM-intensive (Random Access Memory), requires a large screen, has complex graphics, requires keyboard input, etc. Likewise, if the content distribution engine 104 receives the request from a cellular telephone, the content distribution engine 104 can provide a game that can be presented easily on a less-powerful device with a smaller screen.

At stage D, the content distribution engine 104 transmits that game content to the mobile device 102. For example, when the player opens an application or navigates to a webpage associated with the content distribution engine 104, the content distribution engine 104 can transmit the game content to the mobile device 102. Additionally, in some embodiments, the game content that the content distribution engine 104 transmits can include more than a game. For example, if the usage information indicates that the player is at the airport and has an upcoming flight, the content distribution engine 104 can transmit data needed for the player to play a significant number of hands of a card game, several levels of a social game, etc. to the mobile device 102 so that the player can play the game when the player does not have internet connectivity.

Figure 2:
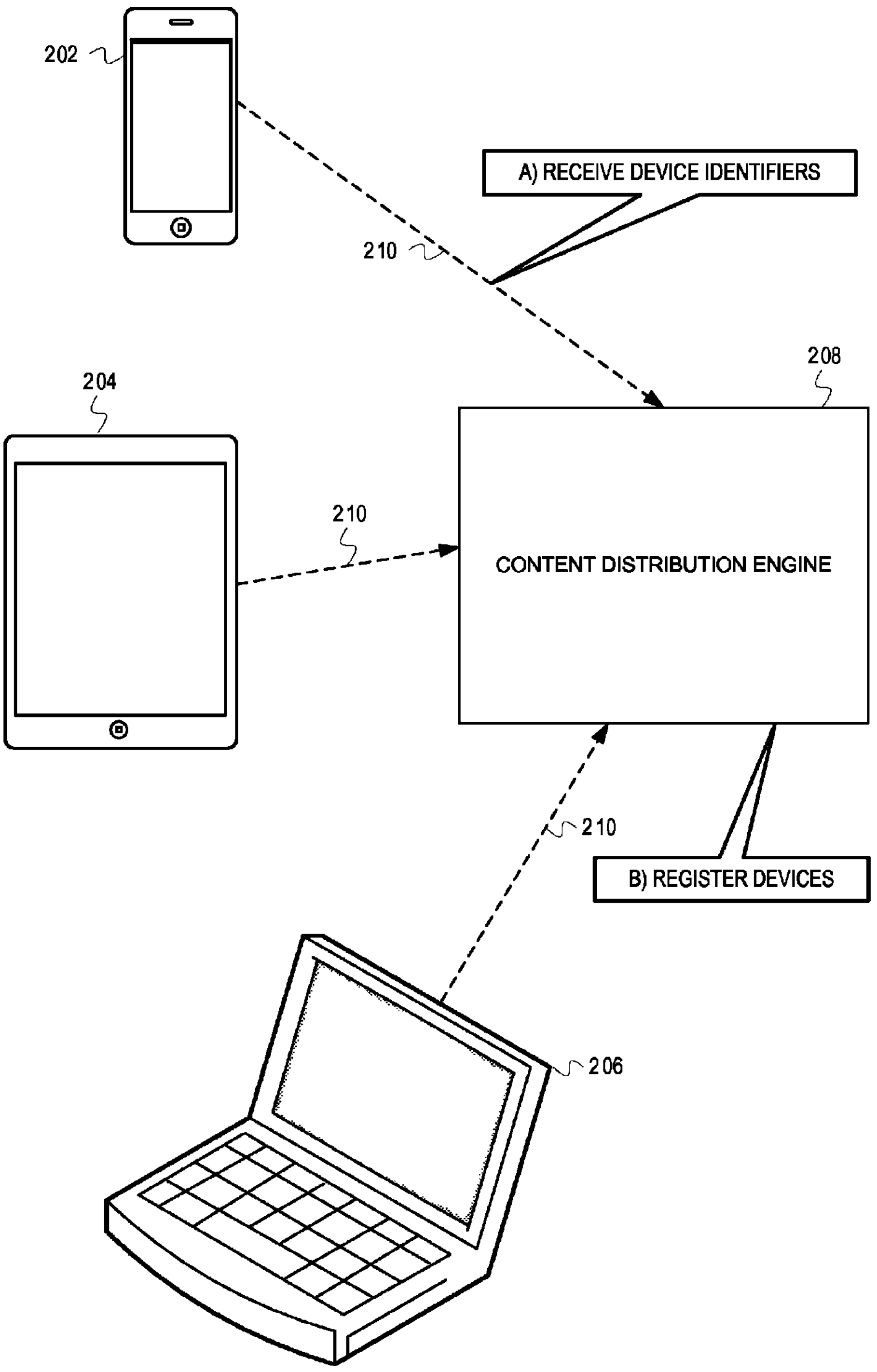
FIG. 2 is a conceptual drawing depicting registration of a plurality of computing devices 202, 204, and 206 with a content distribution engine 208, according to some embodiments of the inventive subject matter.

While FIG. 1 depicts example communications between a mobile device and a content distribution engine, FIG. 2 depicts communications and operations for registering devices with a content distribution engine.

FIG. 2 is a conceptual drawing depicting registration of a plurality of computing devices 202, 204, and 206 with a content distribution engine 208, according to some embodiments. FIG. 2 depicts example operations at stages A-B. The stages are examples and are not necessarily discrete occurrences over time (e.g., operations of different stages may overlap).

At stage A, the content distribution engine 208 receives device identifiers from computing devices 202, 204, and 206, as indicated by arrows 210. As depicted in FIG. 2, computing device 202 is a cellular telephone, computing device 204 is a tablet computer, and computing device 206 is a laptop computer. In some embodiments, content distribution engine 208 can receive a player identifier.

At stage B, the content distribution engine 208 registers the computing devices 202, 204, and 206. In some embodiments, once the computing devices 202, 204, and 206 are registered, the content distribution engine 208 can associate the computing devices 202, 204, and 206 with one another. The content distribution engine 208 can also associate the usage information and affinity information corresponding to each computing device 202, 204, and 206 with the other computing devices 202, 204, 206. This can provide a unified game experience across the registered computing devices 202, 204, and 206. In embodiments where the content distribution engine 208 receives a player identifier, the content distribution engine can register the computing devices 202, 204, and 206 and associate the computing devices 202, 204, and 206 with the player identifier. This can further the unified game experience across the registered computing devices 202, 204, and 206.

Figure 3A:
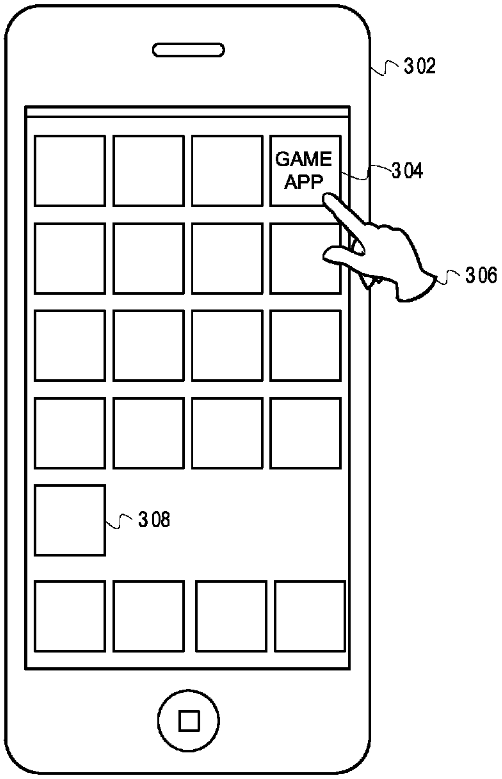
FIG. 3A depicts an example mobile device 302 including an application configured to receive content from a content distribution engine.
Figure 3B:
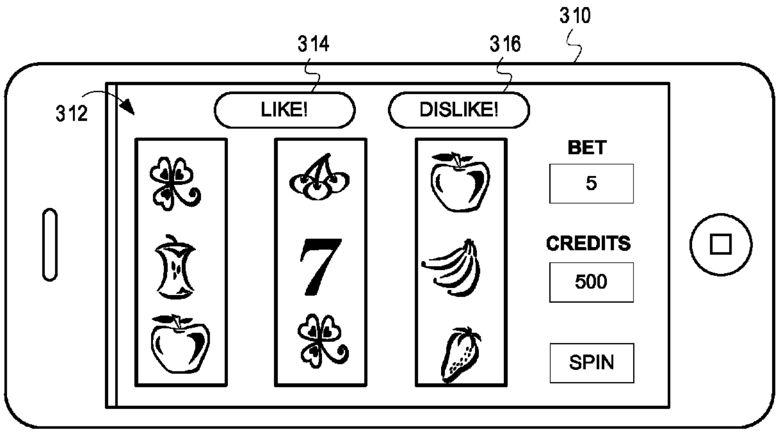
FIG. 3B depicts presentation of example game content received from a content distribution engine on a mobile device 310.

FIGS. 3A and 3B depict an example user interface through which a player can receive game content and play games.

FIG. 3A depicts an example mobile device 302 including an application configured to receive content from a content distribution engine. In FIG. 3A, the mobile device 302 is presenting icons 308 associated with applications resident on the mobile device 302. The mobile device 302 also has an application associated with a content distribution engine, shown as "Game App" icon 304. When the player 306 selects the "Game App" icon 304, the application opens, as depicted in FIG. 3B. In some embodiments, when the application opens, the mobile device 302 immediately presents content received from the content distribution engine. In other embodiments, the mobile device 302 can first present a menu, preference selection menu, home screen, etc. from which the player can navigate through content, select preferences, etc. In some embodiments, the mobile device 302 will only present a menu, preference selection menu, home screen, etc. the first time the application associated with the content distribution engine is run (e.g., to determine initial preferences etc.).

FIG. 3B depicts presentation of example game content received from a content distribution engine on a mobile device 310. As depicted in FIG. 3B, the mobile device 310 is presenting content received from the content distribution engine, which includes a casino-style slots game 312 and affinity indicators 314 and 316. The player can play the game (or interact with whatever type of content is received from the content distribution engine) via the mobile device 310.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable storage media, while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 4:
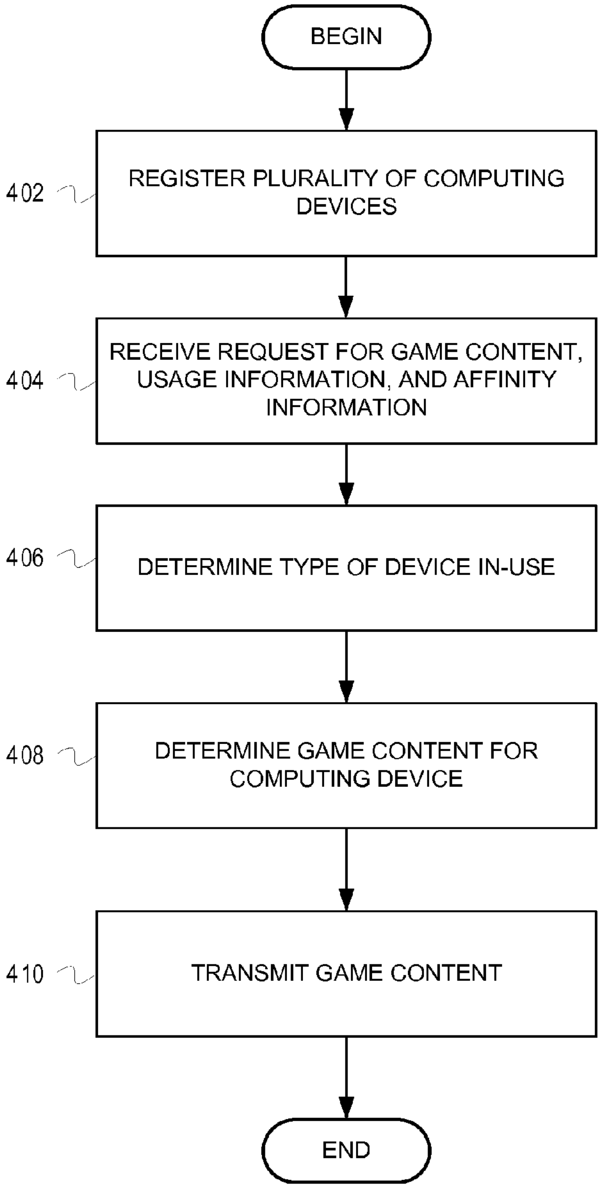
FIG. 4 is a flow diagram illustrating example operations of a content distribution engine, according to some embodiments of the inventive subject matter.

FIG. 4 is a flow diagram illustrating example operations of a content distribution engine, according to some embodiments of the inventive subject matter. The flow begins at block 402.

At block 402, a content distribution engine registers a plurality of computing devices. In some embodiments, the content distribution engine registers each computing device individually (i.e., each computing device is registered separately as opposed to multiple devices being associated with a player account or other computing devices). In other embodiments, the content distribution engine can register a plurality of computing devices as being associated with a single player. In such embodiments, a plurality computing devices used by a single player can be associated with one another. The registration can also include a player identifier (e.g., used by a player to login). In such embodiments, the content distribution engine registers and associates the computing devices with the player identifier. The flow continues at block 404.

At block 404, the content distribution engine receives a request for game content, usage information, and affinity information from the computing devices. The usage information, for example, can include:

- Programs or applications that are being used or have been used on the computing device
- Internet browsing history of the computing device
- Internet connection, type, speed, and reliability
- Current or past geographic location(s) of the computing device
- A type of setting in which the computing device is located (e.g., business meeting, shopping, dinner, etc.)
- Movement and/or acceleration of the computing device
- An activity that the player is engaged in while using the computing device
- Current time of day and other times the computing device is used
- Current day and other days of the week the computing device is used
- Ambient light intensity and/or noise intensity at the computing device's location (e.g., using the computing device's microphone and camera or other light sensor)
- The presence and/or proximity of other computing devices
- The type of the computing device (e.g., desktop computer, laptop computer, tablet computer, cellular telephone, etc.)
- Size of computing device's screen space used for presenting content
- Historical game outcome information The affinity information, for example, can include:

- Preferences selected by the player
- Content that the player has previously indicated a relative liking for
- Content that the player has previously indicated a relative dislike for
- Content that the player is currently indicating a liking for
- Content that the player is currently indicating a disliking for The flow continues at block 406.

Although the operations at blocks 402 through 410 are depicted in FIG. 4, in some embodiments, not all operations depicted in FIG. 4 are necessary. For example, the computing device registration at blocks 402 and 404 does not have to occur every time a computing device makes a request for game content. After the registration is complete, a computing device can interact with the content distribution engine to receive game content via the operations described at blocks 406 through 410.

At block 406, the content distribution engine determines the type of device in-use. For example, the computing device can be a desktop computer, a laptop computer, a tablet computer, a cellular telephone, a PDA, etc. In some embodiments, the computing device can transmit an indication of its type to the content distribution engine (e.g., the indication can be included in the usage information). In some embodiments, the content distribution engine can determine the type of device without receiving an indication of the device type from the computing device. For example, the content distribution engine may receive a device identifier with which it looks-up the device type in a database of registration information associated with the device. The flow continues at block 408.

At block 408, the content distribution engine determines game content for the computing device. In some embodiments, this determination is based on the type of device, usage information, and affinity information. Using this information, the content distribution engine can select content appropriate for the device, environment, and player's liking. For example, if the type of device is a tablet computer, the usage information indicates that the player is in a doctor's office waiting room, and the affinity information indicates that the player prefers sports games, the content distribution engine can determine that the player has time to play an attention-intensive level of a sports game with minimal audio formatted for a tablet computer. Additionally, for example, the content distribution engine can:

- Use information about programs or applications that are being used or have been used on the computing device to determine types of game content that may be relevant to the player based on the programs or applications that are being used or have been used on the computing device
- Use information about internet browsing history of the computing device to determine types of game content that may be relevant to the player based on the internet browsing history
- Use information about internet connection type, speed, and reliability to determine game content that is appropriately graphics-intensive, RAM intensive, etc. or game content with an appropriate data size
- Use information about current or past geographic location(s) of the computing device to determine game content appropriate for the current or past geographic location(s)
- Use information about a type of setting in which the computing device is located to provide game content that is suitable to that setting (e.g., low light-intensity game content in a dark setting, low-concentration game content for a business meeting setting, etc.)
- Use information about an activity the player is engaged in while using the computing device to determine game content suitable to that activity (i.e., game content requiring significant concentration when the player is relaxing at home)
- Information about the current time of day and other times the computing devices is used to determine suitable game content (i.e., the computing device is used while commuting home from work and the current time of day indicates that the player is likely commuting home from work)
- Information about the current day or other days of the week the computing device is used (e.g., it is a weekend day and the player typically likes high-intensity games during the weekend)
- Information about ambient light intensity and/or noise intensity to determine game content having an appropriate light and/or noise intensity
- Use information about presence and/or proximity of other computing devices to select game content that includes interaction with players on the devices that are nearby

- Information about historical game outcome information (e.g., if the player has not won a game for an extended period of time, determine game content that the player will win or is likely to win)

The flow continues at block 410.

At block 410, the content distribution engine transmits the game content to the computing device.

Figure 5:
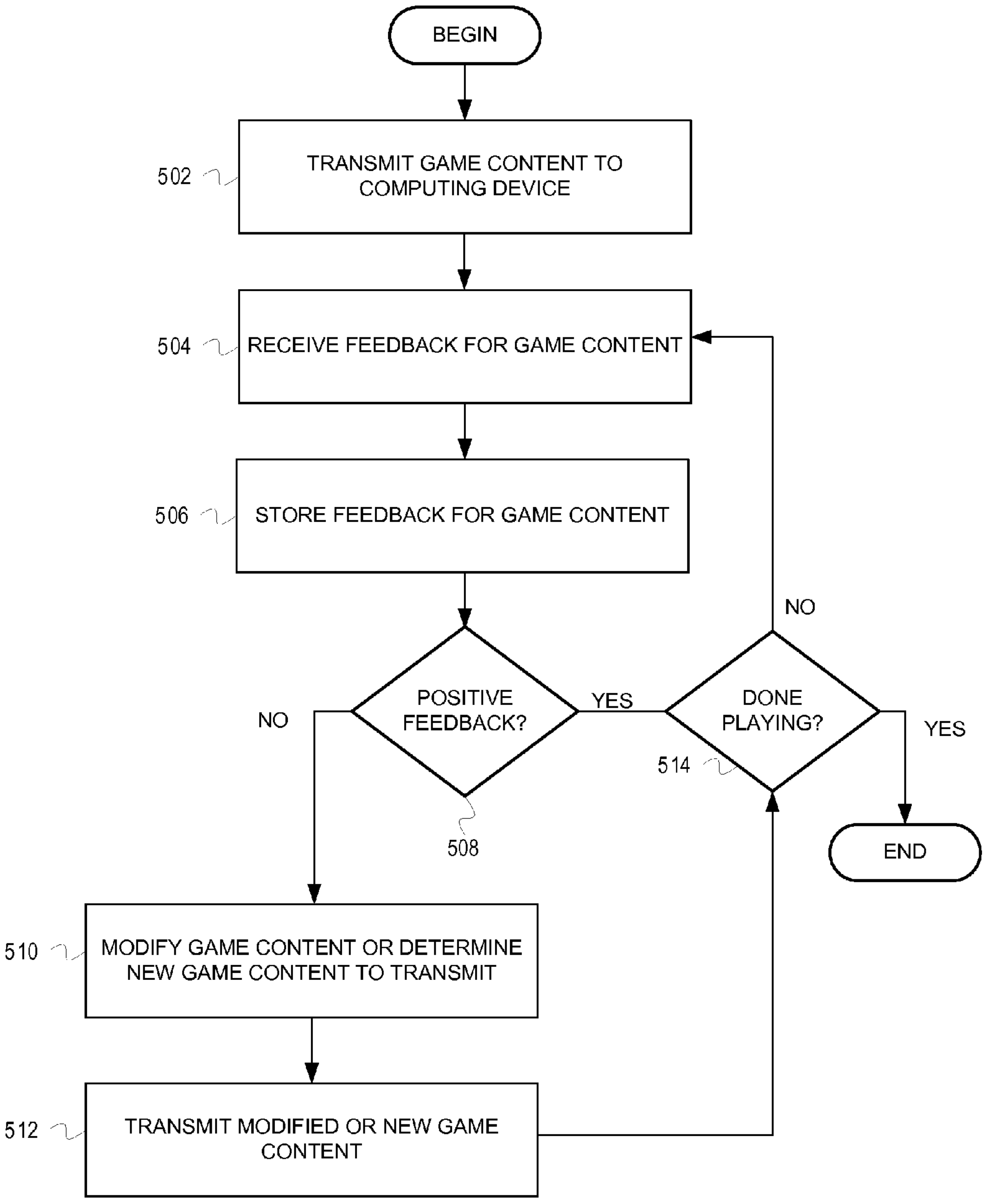
FIG. 5 is a flow diagram illustrating example operations for content modification based on player feedback, according to some embodiments of the inventive subject matter.

While FIG. 4 is a flow diagram illustrating example operations for transmitting game content to a computing device, FIG. 5 is a flow diagram depicting example operations for modifying game content in response to a player's feedback for the game content.

FIG. 5 is a flow diagram illustrating example operations for content modification based on player feedback, according to some embodiments of the inventive subject matter. The flow begins at block 502.

At block 502, the content distribution engine transmits game content to a computing device. The content distribution engine can use the operations described in FIG. 4 to select and transmit game content to the computing device. The flow continues at block 504.

At block 504, the content distribution engine receives feedback for the game content. For example, a player can indicate that they enjoy the game content transmitted to the computing device. Alternatively, the player can indicate that they do not enjoy the game content transmitted to the computing device. In some embodiments, the player feedback can be more extensive than a simple like or dislike of the game content. For example, the player feedback can indicate specific aspects of the game content which the player likes or dislikes. In some embodiments, the feedback for the game content is received, and the game content updated, in real time. For example, when the player provides negative feedback for the game content, the content distribution engine immediately provides new or modified game content. The flow continues at block 506.

At block 506, the content distribution engine stores the feedback. In some embodiments, the content distribution engine stores the feedback in association with one or more of the computing device, a player identifier, a player account, etc. In such embodiments, the content distribution engine can aggregate the feedback (along with usage information) to establish a rich database of usage information and affinity information for the computing device and/or player. The flow continues at decision diamond 508.

At decision diamond 508, the content distribution engine analyzes the feedback to determine whether it is positive feedback (i.e., the player likes the game content and/or aspects of the game content) or negative feedback (i.e., the player dislikes the game content and/or aspects of the game content). If the feedback is positive feedback, the flow continues at decision diamond 514. If the feedback is negative feedback, the flow continues at block 510.

At block 510 the content distribution engine modifies the game content or determines new game content to transmit, based on the negative feedback. Additionally, the content distribution engine can modify the game content or determine new game content to transmit based on the device type, usage information, and affinity information. The content distribution engine can modify the content, for example, by:

- Altering the volatility of the game content
- Adjusting the resolution of the game content and/or aspects of the game content
- Altering the presentation of the game content and/or aspects of the game content
- Adjusting the sound level of the game content
- Adjusting the brightness of the game content
- Modifying the game content to provide haptic feedback indicating a result of the game content
- Adjusting the game content duration
- Adjusting the difficulty of the game content
- Changing the theme of the game content
- Changing the difficulty of the game content
- Changing the duration of the game content
- Modifying reel symbols of the game content
- Modifying bonus types for the game content
- Modifying presentation of a home screen or game menu
- Modifying win celebration sequences, animations, sounds, etc.
- Modifying a time period in between bonuses
- Modifying a structure of game levels If the content distribution engine transmits new game content, the content distribution engine determines new content suitable for the player based on the usage information and affinity information (including the negative feedback received at block 508). The flow continues at block 512.

At block 512, the content distribution engine transmits the modified or new game content. If the content distribution engine modified the game content at block 510, the content distribution engine transmits that modified game content. If the content distribution engine selected new game content at block 510, the content distribution engine transmits the new game content. The flow continues at decision diamond 514.

At decision diamond 514, the content distribution engine determines if the player is done using the game content. If the player is not done using the game content, the flow continues at block 504. If the player is done using the game content, the flow ends.

Although examples refer to the content distribution engine transmitting game content, in some embodiments, media other than, or in conjunction with, game content can be transmitted. For example, based on the usage information and affinity information, the content distribution engine can transmit advertisements, coupons, news articles, videos, pictures, or any other media.

Although examples refer to accessing content received from a content distribution engine via an application running on the computing device, in some embodiments, a player can access content received from the content distribution engine via a web browser. For example, the player can navigate the web browser to a webpage or website associated with the content distribution engine. In some embodiments, the player can login, or the computing device can transmit a device identifier (or other means for identification) to the content distribution engine. In response, the content distribution engine can transmit game content to the computing device.

Although examples refer to transmitting game content to a player based on player convenience, in some embodiments, the content distribution engine can transmit game content to players to optimize server load. For example, in some embodiments, the content distribution engine may receive few requests during nighttime hours. In such embodiments, the content distribution engine can transmit game content to a players' device during this off-peak time. The players' device(s) can store the game content until the player accesses the game content. For example, the content distribution engine can transmit several slot reel spins, poker hands, social game levels, etc. to a player's device during off-peak hours. The player can then access the transmitted game content without further interaction with the content distribution engine.

Wagering Game Networks

Figure 6:
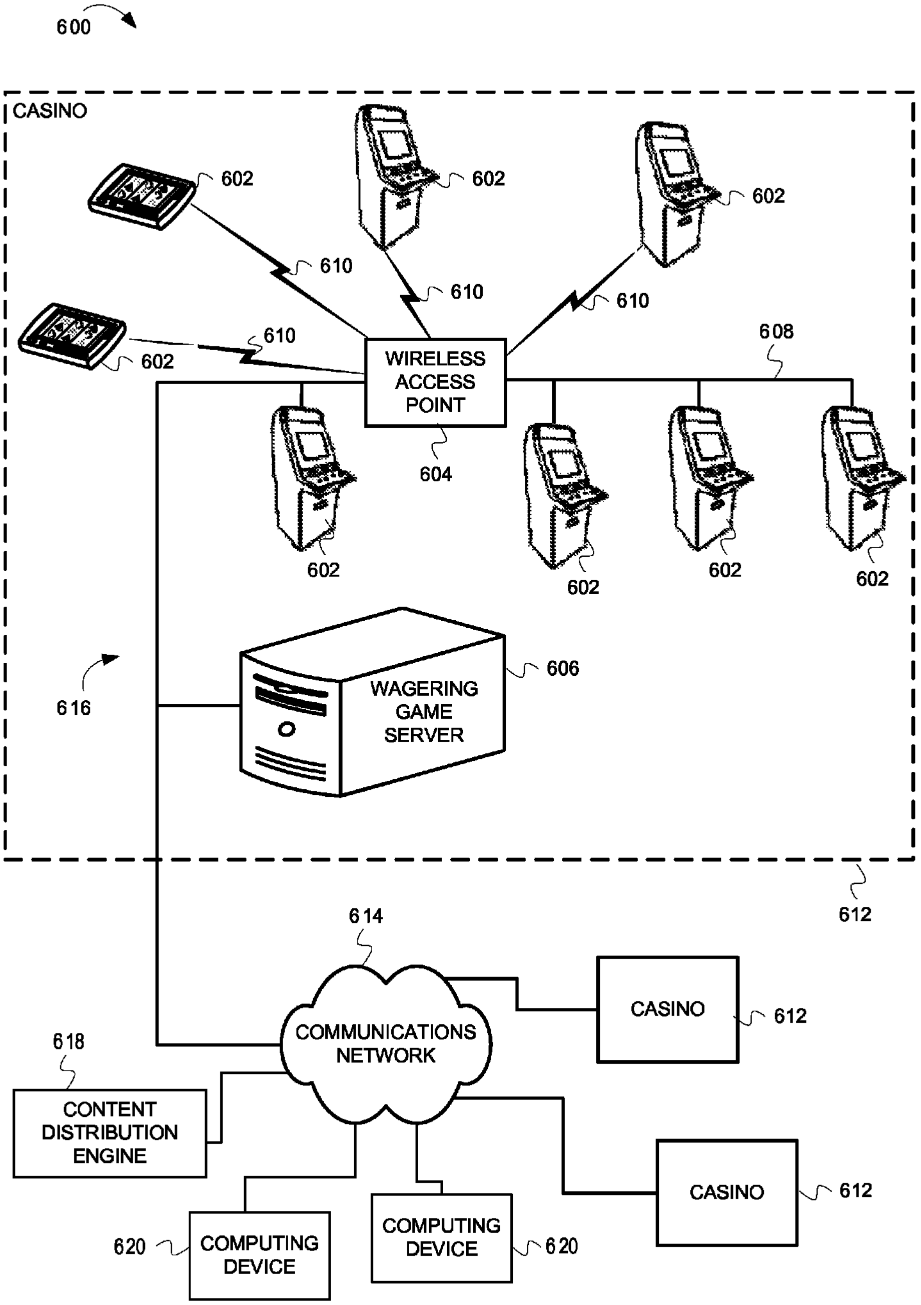
FIG. 6 is a block diagram illustrating a wagering game network 600, according to example embodiments of the invention.

FIG. 6 is a block diagram illustrating a wagering game network 600, according to example embodiments of the invention. As shown in FIG. 6, the wagering game network 600 includes a plurality of casinos 612 connected to a communications network 614.

Each casino 612 includes a local area network 616, which includes an access point 604, a wagering game server 606, and wagering game machines 602. The access point 604 provides wireless communication links 610 and wired communication links 608. The wired and wireless communication links can employ any suitable connection technology, such as Bluetooth, 802.11, Ethernet, public switched telephone networks, SONET, etc. In some embodiments, the wagering game server 606 can serve wagering games and distribute content to devices located in other casinos 612 or at other locations on the communications network 614. Additionally, a content distribution engine 618 and computing devices 620 are in communication with the communications network 614. The content distribution engine 618 receives usage information (including device type information) and affinity information from the computing devices 620 and determines game content to transmit to the computing devices 620 based on the usage information and affinity information (as described herein).

The wagering game machines 602 described herein can take any suitable form, such as floor standing models, handheld mobile units, bartop models, workstation-type console models, etc. Further, the wagering game machines 602 can be primarily dedicated for use in conducting wagering games, or can include non-dedicated devices, such as mobile phones, personal digital assistants, personal computers, etc. In one embodiment, the wagering game network 600 can include other network devices, such as accounting servers, wide area progressive servers, player tracking servers, and/or other devices suitable for use in connection with embodiments of the invention.

In some embodiments, wagering game machines 602 and wagering game servers 606 work together such that a wagering game machine 602 can be operated as a thin, thick, or intermediate client. For example, one or more elements of game play may be controlled by the wagering game machine 602 (client) or the wagering game server 606 (server). Game play elements can include executable game code, lookup tables, configuration files, game outcome, audio or visual representations of the game, game assets or the like. In a thin-client example, the wagering game server 606 can perform functions such as determining game outcome or managing assets, while the wagering game machine 602 can present a graphical representation of such outcome or asset modification to the user (e.g., player). In a thick-client example, the wagering game machines 602 can determine game outcomes and communicate the outcomes to the wagering game server 606 for recording or managing a player's account.

In some embodiments, either the wagering game machines 602 (client) or the wagering game server 606 can provide functionality that is not directly related to game play. For example, account transactions and account rules may be managed centrally (e.g., by the wagering game server 606) or locally (e.g., by the wagering game machine 602). Other functionality not directly related to game play may include power management, presentation of advertising, software or firmware updates, system quality or security checks, etc.

Any of the wagering game network components (e.g., the wagering game machines 602) can include hardware and machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The invention claimed is:

1. A method for distributing game content over a network, the method comprising:

registering, by a content distribution engine, a plurality of devices of one or more device types, the plurality of devices configured to present the game content;

receiving, by the content distribution engine via the network, usage information indicating usage of the devices and affinity information indicating user affinities associated with the devices, wherein the usage information includes information indicating an environment in which the device resides;

detecting, by the content distribution engine that a device of the plurality of devices is in use;

determining, by the content distribution engine, based at least in part on the information indicating the environment in which the device resides and the affinity information, the game content for the device in response to detecting that the device is in use; and transmitting the game content by the content distribution engine to the device via the network.

2. The method of claim 1, wherein the user affinities indicate a preference for the game content.

3. The method of claim 1, further comprising:

determining that the affinity information indicates a dislike for the game content; and based, at least in part, on the dislike for the game content, performing at least one of transmitting modified game content to the device, or transmitting different game content to the device.

4. The method of claim 3, wherein the modified game content includes one or more of a modified volatility for the game content, a modified size of the game content, a modified type of the game content, a modified presentation of the game content, a modified sound level of the game content, a modified theme of the game content, and a modified difficulty level of the game content.

5. The method of claim 1, further comprising:

receiving, from the plurality of devices, device identifiers; and wherein the registering includes, associating the devices with a player account, and storing the device identifiers, the usage information, and the affinity information in association with the player account.

6. The method of claim 1, wherein the usage information includes one or more of application used on the devices, a network signal strength, a geographic location of the device, internet browsing history of the devices, movement of the device, and historical game outcome information.

7. A method for selecting and distributing wagering game content, the method comprising:

registering a plurality of devices with a wagering game content delivery service;

receiving, from a device of the plurality of devices, information indicating user preference for the wagering game content, application usage on the device, an environment in which the device resides, and one or more recent locations of the device;

determining a device type for the device;

selecting wagering game content for the device based on the device type and the information received from the device;

transmitting, to the device, the wagering game content.

8. The method of claim 7, further comprising:

determining that the user preference indicates a dislike for the wagering game content provided to the device; and in response to the determining that the user preference indicates the dislike, performing one or more of transmitting modified wagering game content to the device or transmitting new wagering game content to the device.

9. The method of claim 8, wherein the modified wagering game content includes one or more of a modified volatility for the wagering game content, a modified size of the wagering game content, a modified type of the wagering game content, a modified presentation of the wagering game content, a modified sound level of the wagering game content, a modified theme of the wagering game content, and a modified difficulty level of the wagering game content.

10. The method of claim 7, further comprising detecting, via a microphone of the device, that the environment in which the device resides has a noise intensity below a threshold noise level and, wherein said determining, by the content distribution engine, based at least in part on the information indicating the environment in which the device resides and the affinity information, the game content for the device includes determining that the wagering game content has a given sound setting that is suitable for presentation in the environment.

11. One or more non-transitory, computer readable storage media, having instructions stored therein, which, when executed by one or more processors, causes the one or more processors to perform operations that comprise:

registering, by a content distribution engine, a plurality of devices of one or more types, the plurality of devices configured to present game content;

receiving, by the content distribution engine via a network, usage information indicating usage of the devices and affinity information indicating user affinities associated with the devices, wherein the usage information includes information indicating an environment in which the device resides;

detecting by the content distribution engine, that a device of the plurality of devices is in use;

determining, by the content distribution engine, based at least in part on the information indicating the environment in which the device resides and the affinity information, the game content for the device in response to the detecting that the device is in use; and transmitting the game content by the content distribution engine to the device via the network.

12. The one or more non-transitory, computer readable storage media of claim 11, wherein the user affinities indicate a relative degree of preference for the game content.

13. The one or more non-transitory, computer readable storage media of claim 11, further comprising:

receiving, from the plurality of devices, device identifiers; and wherein the registering includes, associating the devices with a player account, and storing the device identifiers, the usage information, and the affinity information in association with the player account.

14. The one or more non-transitory, computer readable storage media of claim 11, further comprising:

determining that the affinity information indicates a dislike for the game content; and performing one of modifying the game content to transmit to the device, and determining new game content for the device based, at least in part, on the dislike for the game content.

15. The one or more non-transitory, computer readable storage media of claim 14, wherein the modifying the game content includes one or more of modifying a volatility for the game content, modifying a size of the game content, modifying a type of the game content, modifying presentation of the game content, modifying a sound level of the game content, modifying a theme of the game content, and modifying a difficulty of the game content.

16. An apparatus comprising:

at least one processor; and a memory storage device configured to store instructions, which when executed by the at least one processor cause the apparatus to register a plurality of devices with a wagering game content delivery-service, receive, from a device of the plurality of devices, information indicating user preference for wagering game content, application usage on the device, an environment in which the device resides, and one or more recent locations of the device, determine a device type for the device select wagering game content for the device based on the device type and information received from the device, and transmit, to the device, the wagering game content.

17. The apparatus of claim 16, wherein the memory storage device is further configured to store instructions that, when executed by the at least one processor cause the apparatus to:

determine that the user preference indicates a dislike for the wagering game content provided to the device; and in response to determination that the user preference indicates the dislike for the wagering game content, one or more of transmit modified wagering game content to the device or transmit different wagering game content to the device.

18. The apparatus of claim 17, wherein the modified wagering game content includes one or more of a modified volatility for the wagering game content, a modified size of the wagering game content, a modified type of the wagering game content, a modified presentation of the wagering game content, a modified sound level of the wagering game content, a modified theme of the wagering game content, and a modified difficulty level of the wagering game content.

19. The method of claim 1 determining, based at least in part on the information indicating the environment in which the device resides, a player distraction level; and selecting, based at least in part on the player distraction level, the game content.

20. The method of claim 19, wherein the determining the player distraction level comprises determining, based at least in part on the information indicating the environment in which the device resides, that the player distraction level is below a given threshold value, and wherein the selecting the game content comprises selecting attention-intensive game content in response to the determining that the player distraction level is below the given threshold value.

21. The method of claim 19, wherein the determining the player distraction level comprises determining, based at least in part on the information indicating the environment in which the device resides, that the player distraction level is above a given threshold value, and wherein the selecting the game content comprises selecting non-attention-intensive game content in response to the determining that the player distraction level is above the given threshold value.

22. The method of claim 1, wherein the information indicating the environment in which the device resides includes information indicating the device resides in at least one member of the group consisting of a home, office, waiting room, airport, business meeting, shopping environment, and meal environment.

23. The method of claim 1, wherein the usage information further includes an activity that the user is engaged in while using the device, and wherein said determining based at least in part on the information indicating the environment in which the device resides and the affinity information, the game content for the device, further includes determining the game content based, at least in part, on the activity.

* * * * *